Jan. 1, 1935.  S. MENDELSOHN  1,986,513
ELECTRICALLY OPERATED PHOTOFLASH ATTACHMENT
Filed Jan. 15, 1932   2 Sheets-Sheet 1
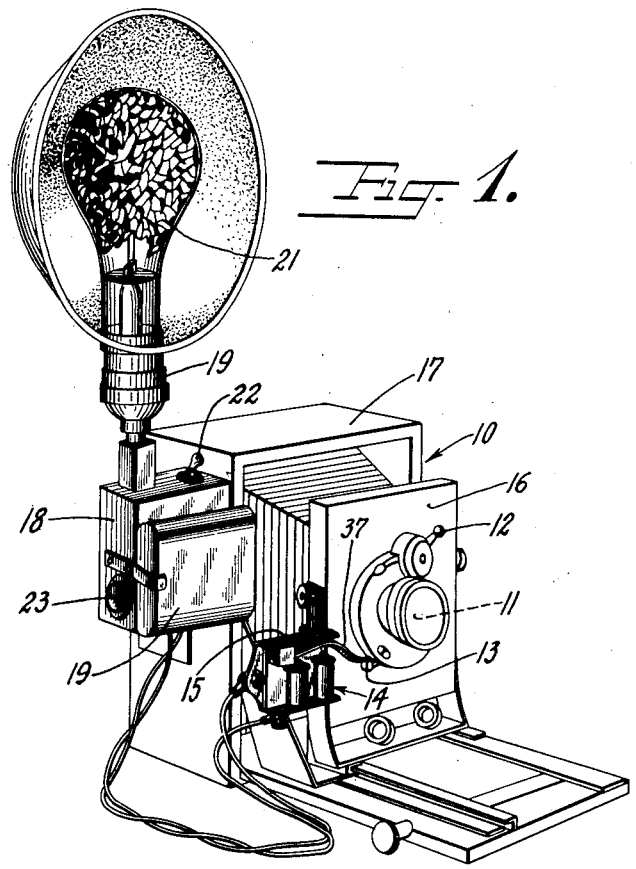
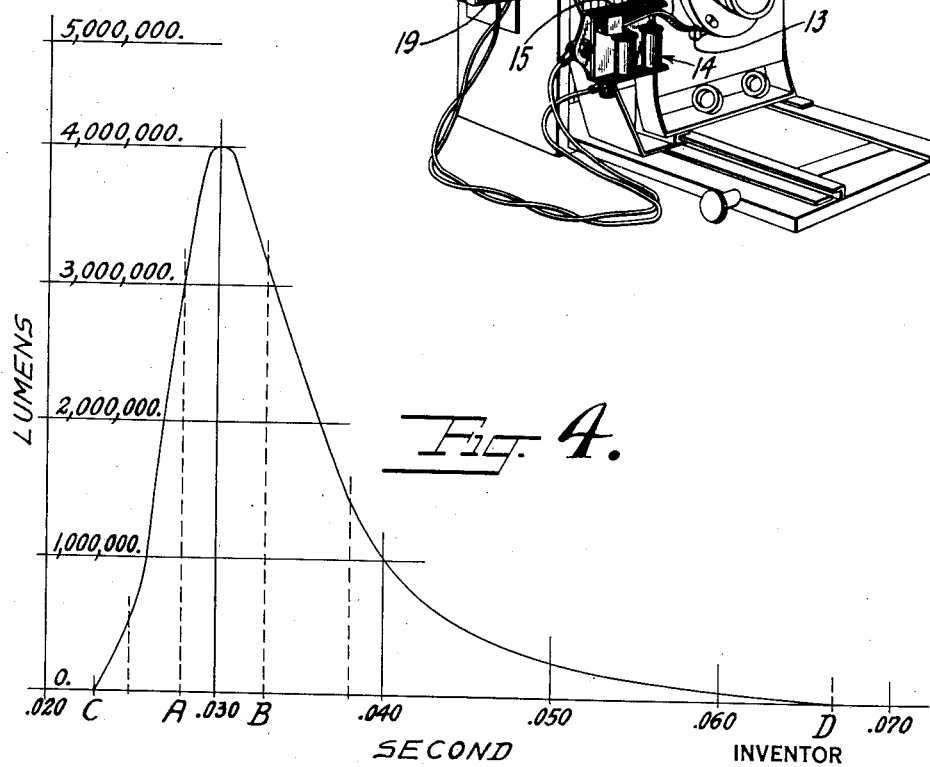
INVENTOR
S. MENDELSOHN
BY
ATTORNEY

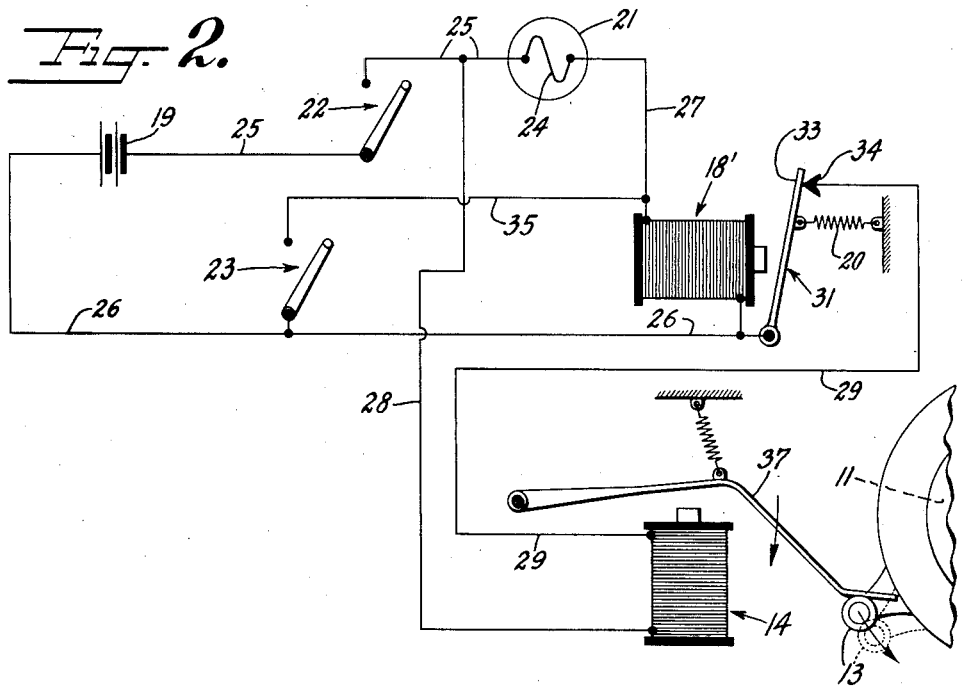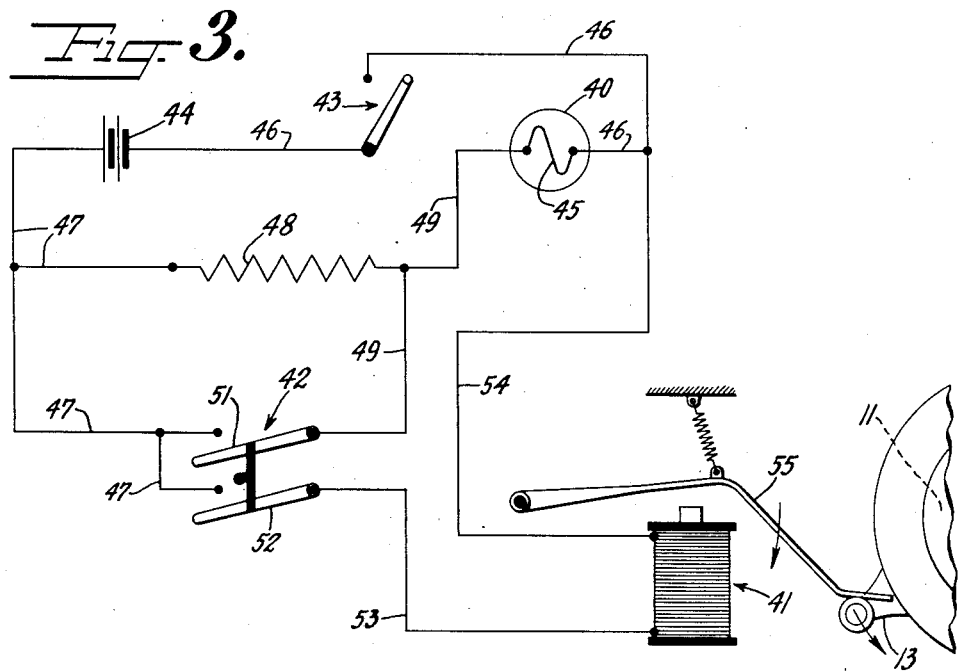

Patented Jan. 1, 1935

1,986,513

UNITED STATES PATENT OFFICE 1,986,513

ELECTRICALLY OPERATED PHOTOFLASH ATTACHMENT

Samuel Mendelsohn, Brooklyn, N. Y.

Application January 15, 1932, Serial No. 586,931

14 Claims. (Cl. 67—29)

This invention relates to photographic apparatus and relates more particularly to a device for causing instantaneous illumination and the operation of a camera shutter simultaneously.

The practice of taking photographs with artificial light such as that which is termed flash light, is well known in the photographic art. A recent development in connection with the taking of flash light pictures is a device called a photoflash lamp such for example as shown in Patent 1,776,637 issued September 23, 1930.

The photoflash lamp consists of a transparent bulb in which is sealed a filament or heater element and around this element is disposed a quantity of combustible material such as aluminum foil. The bulb contains a gas such as pure oxygen which promotes combustion of the foil when electrical energy is passed through the filament, heating the same to a temperature sufficiently high to ignite the flash-producing material.

A photoflash lamp is similar in general construction to an incandescent electric lamp and is usually provided with a standard screw thread base and may be operated by application to the ordinary commercial line voltage. For the purpose of practicing photography in places where it is not convenient to use line voltage, the photoflash lamp may be operated by means of a suitable dry cell. When attempting to use a photoflash lamp, while taking what is known as a snapshot or high speed exposure, it is obvious that means must be provided so that the camera shutter be open to make the exposure at the time the flash occurs. The ordinary flashlamp produces an intense light for a very brief period of time, generally for about .060 of a second. During this interval the light produced reaches its highest peak and then follows a downward intensity curve.

It will be evident that for the best results, the camera shutter should be open when the highest intensity of light is produced. Attempts have been made to mechanically operate the camera shutter at the time the flash occurs and by spring actuated elements it has been possible to operate the shutter at about the time the current passes through the heater element to produce a flash. It has been found, however, that a time lag occurs between the operation of the shutter and the actual ignition of the light giving material and in cases where the shutter operates at high speed, it is impossible to obtain entirely satisfactory results with means heretofore employed. In cases where the shutter operation is relatively slow, the exposure is very often made during the period when the light is the least intense and the same is true if the shutter operates too fast or the respective operations are otherwise out of time.

The lag difference in the time relation between the operation of the shutter and the occurrence of the flash makes the operation of devices as heretofore employed unsatisfactory and impractical. I have found that the time lag is due to the fact that when electrical energy is passed through the cold filament a certain time interval is required to heat the filament and it was therefore difficult in mechanisms heretofore proposed to operate the shutter at exactly the right time.

In accordance with the present invention, I provide a method of operating a photoflash lamp by first initially heating the filament to a temperature insufficient to ignite the flash material, and then passing an amount of electrical current through the filament sufficient to raise its temperature to ignite the foil which flow of current also operates the shutter so that the operation of the shutter and flashing operation are simultaneous.

The invention will be more clearly understood by reference to the accompanying description together with the accompanying drawings in which:

Fig. 1 is a perspective view of a camera having the present invention applied thereto;

Fig. 2 is a diagram of the electrical wiring employed to operate the mechanism shown in Fig. 1;

Fig. 3 is a modification of the wiring diagram shown in Fig. 2 and

Fig. 4 is an oscillograph curve showing the variation of intensity of light during the operation of a photoflash bulb.

As shown in Fig. 1 of the drawings, the invention may be applied to a camera 10 having the usual shutter 11 provided with a shutter setting arm 12 and shutter release arm 13. Adjacent to the release arm is a solenoid 14 which may be contained in a holder 15 and suitably attached to the face plate 16 of the camera. On the box 17 of the camera is attached a holder 18 which may contain a relay and a switch to be later described and a battery 19 may be suitably supported by clips on the holder 18. The holder 18 is provided with a socket 19 to receive a photoflash lamp 21. A switch 22 is provided to pass a heating current through the filament of the photoflash lamp and an actuating switch 23 serves to cause a flow of current for the operation of the shutter and the photoflash lamp.

The above general description gives an outline of the mechanism for operating a photoflash lamp substantially simultaneously with the opening of the shutter and it will be obvious that the arrangement of the operating parts constituting the disclosed construction may be varied in accordance with the particular construction of the camera employed.

The electrical system will be more clearly understood by reference to Fig. 2 which shows a diagram of the circuit including the photoflash lamp 21, a cut-out solenoid 18', operating solenoid 14, switches 22, 23 and battery 19. Filament or heater element 24 of the photoflash lamp is connected to the battery 19 on one side by means of a conductor 25 through switch 22. The opposite side of the battery is connected by a conductor 26 with one end of the coil of the solenoid 18'. The opposite end of the coil of the solenoid 18' is connected by a conductor 27 to the opposite end of the filament 24. When the switch 22 is closed, current will flow through the filament 24 but, by reason of the solenoid winding, a resistance is placed in circuit with the filament and it is therefore not heated to a temperature sufficient to ignite the flash material.

When the switch 22 is closed, electrical energy normally flows through a conductor 28 to one side of the solenoid 14 and thence through a conductor 29, switch 31, conductor 26 and to the battery 19. When the current flows through the circuit for preheating the lamp, however, armature 33 which constitutes a part of the switch 31 is moved away from its contact 34 thus breaking the circuit to the solenoid 14. After the filament has been preheated, actuating switch 23 is operated and current flows through a conductor 35, through the filament 24, conductor 25 and to the battery 19. The opposite side of the battery is connected by the conductor 26 with the switch 23.

Inasmuch as the conductor 35 is connected to the conductor 27 between the solenoid 18' and the filament 24, the closing of the switch 23 will short circuit solenoid 18' and the armature 33 thereof will engage contact 34 causing a flow of current through the solenoid 14 to actuate its armature 37 and thereby operate the shutter 11 through contact with shutter arm 13.

The above described electrical system includes first a primary or preheating circuit including the filament 24, conductor 25, battery 19, conductor 26 and the coil of the solenoid 18', the solenoid 18' also operating to break the circuit including the shutter actuating solenoid 14.

A secondary circuit which operates to heat the filament sufficient to ignite flashlight material and includes the filament 24, conductor 25, switch 22 (which is closed) battery 19, conductor 26, switch 23 and conductors 35 and 27. This circuit which operates to cut-out the solenoid 18', permits armature 33 to return under action of any suitable means such as a spring 20 and to close the circuit including solenoid 14 thereby actuating the shutter 11.

A shutter actuating circuit including the solenoid 14, conductors 28, 25, battery 19, conductor 26, solenoid switch 31 and conductor 29.

In Fig. 3 a modified form of the circuit is shown including a photoflash lamp 40, an actuating solenoid 41, a double throw switch 42, a single throw switch 43 and a battery 44.

Current is caused to flow in a filament 45 when switch 43 is closed and current for preheating the filament flows through a conductor 46 connected to one side of the filament 45 and to one side of the battery 44. The opposite side of the battery is connected with a conductor 47 which leads to one end of a resistance element 48.

The opposite end of said resistance element is connected by a conductor 49 with the opposite side of the filament 45. It will be evident that current flowing from the battery when passing through the resistance 48 will be reduced and may be made insufficient to heat the filament to a temperature to ignite flashlight material, but sufficient to elevate the temperature of the filament ready for a flashing operation. When the double throw switch 42 is actuated, an arm 51 thereof connects conductors 47 and 49 thus directly connecting the filament with the battery and short circuiting the resistance 48 and an arm 52 of the switch connects conductor 47 with a conductor 53 leading to one end of the coil of the armature 41. The opposite end of the coil of said armature is connected by conductor 54 with conductor 46 which leads to the battery 44. When the switch 42 is actuated therefor, the resistance 48 is cut out and the solenoid actuated to move its armature 55 and operate the shutter release arm 13.

The modified construction above described includes first a primary or preheating circuit consisting of the filament 45, conductor 46 battery 44, conductor 47, resistance 48 and conductor 49.

A secondary circuit for heating the filament to ignite flashlight material including the filament 45, conductor 46 battery 44, conductor 47, one side of the double pole switch 42 and conductor 49.

A shutter actuating circuit including the solenoid 41 conductors 54, 46, switch 43, battery 44 conductor 47 one side of the double pole switch 42 and a conductor 53.

It will be evident that the present construction may be modified or arranged to fit varying conditions and that although a battery is indicated, it is obvious that the system may be arranged to be operable on commercial line or other voltages.

Fig. 4 shows an oscillograph curve and gives the curve of high intensity of the flash. An ideal condition is reached when the camera shutter is opened between A and B and in cases where the time lag is not taken care of, the shutter may open .020 of a second too soon and the picture will be taken between A and C or where it is necessary to mechanically adjust the shutter with respect to the time of the flash, the shutter may, by reason of friction or lost motion, be opened at any point between B and D, in which case altho an exposure may be made, the best results are not attained.

It has been found that the time lag which is due to the necessary heating of the filament before the flash occurs, has heretofore resulted in uncertain conditions whereas by reason of the present invention, the operating of the shutter is timed to make the exposure during the period in which the flashlight material gives the most intense light.

Altho the preferred embodiment of the invention is shown and described herein, it is understood that modifications may be made therein without departing from the spirit and scope of the invention as set forth in the appended claims.

What is claimed is:

1. A device for operating a camera shutter and a photoflash lamp comprising an electrical circuit including the heater element of said lamp, means for causing a flow of electrical energy through the heater of said lamp to elevate the temperature thereof, means for actuating a camera shutter, means for increasing the amount of electrical energy passing through said heater to heat it to flashing temperature and means for causing said second and third mentioned means to operate simultaneously.

2. A device for operating a camera shutter and a photoflash lamp simultaneously, comprising a primary electrical circuit including the heater element of said lamp, a secondary circuit including said heater element, a shutter actuating circuit including electrically operable means for actuating said shutter, a source of electrical energy, means for passing electrical energy through said primary circuit and means for simultaneously passing electrical energy through said secondary circuit and said shutter actuating circuit.

3. A device for operating a photoflash lamp in time relation to the operating of a camera shutter which comprises a member for actuating said shutter, means for preheating the filament of said lamp, means for passing electrical energy through said lamp to operate same and means for moving said member to actuate said shutter.

4. A device for operating a photoflash lamp and a camera shutter comprising an electrical circuit, a source of electrical energy for said circuit, the heater element of the photoflash lamp in said circuit, another circuit including a solenoid for operating a camera shutter, means for causing a flow of electrical energy from said source through said element, a resistance to reduce the amount of current flow through said element and means for cutting out said resistance and causing a flow of current through said element and said solenoid to cause the latter to actuate said shutter simultaneously with the operation of said lamp.

5. A device for operating a photoflash lamp and a camera shutter comprising an electrical system, including a source of electrical energy, a circuit for preheating the heater element of a lamp, a circuit including electrically operable means for operating a shutter, a circuit for the flow of current to operate said lamp and means for causing a flow of electrical energy in said circuits to flash said lamp and actuate said electrically operable means.

6. A device for operating a photoflash lamp and a camera shutter simultaneously, comprising a source of electrical energy, means for passing an amount of electrical energy through the heater in said lamp to heat the same to a temperature insufficient to operate the lamp, a camera shutter, a circuit for the passage of an amount of electrical energy through said heater to flash said lamp, electrically operable means for actuating said shutter and means for passing electrical energy through said heater to operate said lamp and actuate said shutter.

7. A device for operating a photoflash lamp and a camera shutter simultaneously, comprising a source of electrical energy, means for passing an initial preheating current through the filament of said lamp, means for passing an operating current through the filament of said lamp, a camera shutter, electrically operable means for actuating said shutter and means for simultaneously passing a current through said filament and said means for operating said shutter.

8. A device for operating a camera shutter and a photoflash lamp simultaneously, comprising a source of electrical energy, an electrical system including the heater element of the lamp, electrically operable means for operating a shutter, means for passing an amount of said electrical energy through said element to heat the same to a temperature insufficient to flash said lamp, means for passing an amount of said electrical energy through said element sufficient to flash said lamp, said last named means operating to cause electrical energy to actuate said shutter operating means.

9. An electrical system for operating a camera shutter and a photoflash lamp simultaneously, comprising a source of electrical energy, a circuit including the heater element of said lamp and means for limiting the amount of current flow through said element, means for causing current to flow through said circuit, another circuit including said heater element for the flow of current therethrough in the absence of said resistance, another circuit including electrically operable means for actuating a camera shutter and means for causing a simultaneous flow of current through said last two circuits.

10. A device for operating a camera shutter and a photoflash lamp or the like simultaneously, comprising means for heating the igniter of said lamp to a temperature below the temperature required to flash the lamp, means for heating said igniter to operating temperature, means for operating a camera shutter and means for simultaneously operating said second and third mentioned means.

11. A system for operating a camera shutter and a photoflash lamp or the like simultaneously, comprising a source of electrical energy, a circuit including the igniter of said lamp and the coil of a solenoid, another circuit including said igniter for a flow of current short-circuiting said coil, another circuit including another solenoid for operating a camera shutter and a switch adapted to be opened upon a flow of current through said first mentioned solenoid, means for causing a flow of current through said first named circuit to preheat the igniter and break the last named circuit and means for causing a flow of current through said second and third mentioned circuits to the exclusion of a flow of any appreciable amount of current through said first named circuit.

12. The method of operating a camera shutter during the operation of a photoflash lamp, which comprises causing a flow of an amount of electrical energy through the filament of a photoflash lamp insufficient to flash the lamp, causing the flow of a greater amount of electrical current through the filament to flash the lamp and in utilizing the second flow of current to operate the camera shutter.

13. The method of operating a camera shutter during the operation of a photoflash lamp which comprises causing the flow of an amount of electrical current through the filament of a photoflash lamp insufficient to flash the lamp but sufficient to elevate the temperature of the filament, causing a second flow of current through the filament while heated to flash the lamp and in utilizing the second flow of current to operate a camera shutter.

14. A device for operating a camera shutter and a photoflash lamp comprising an electrical circuit including the heater element of said lamp, a source of electrical energy, means for limiting the amount of current in said circuit, a second electrical circuit including an electrically operable camera shutter and means for cutting out said first mentioned means and for causing a flow of electrical energy to flash said lamp and operate said camera shutter.

SAMUEL MENDELSOHN.